US010036348B2

(12) United States Patent
Caruel et al.

(10) Patent No.: US 10,036,348 B2
(45) Date of Patent: Jul. 31, 2018

(54) METHOD FOR CONTROLLING A VARIABLE NOZZLE SECTION OF AN AIRCRAFT

(71) Applicant: AIRCELLE, Gonfreville l'Orcher (FR)

(72) Inventors: Pierre Caruel, Le Havre (FR); Hervé Hurlin, Igny (FR); Olivier Kerbler, Antony (FR)

(73) Assignee: AIRCELLE, Gonfreville l'Orcher (FR)

( * ) Notice: Subject to any disclaimer, the term of this patent is extended or adjusted under 35 U.S.C. 154(b) by 757 days.

(21) Appl. No.: 14/584,435

(22) Filed: Dec. 29, 2014

(65) Prior Publication Data
US 2015/0108235 A1 Apr. 23, 2015

Related U.S. Application Data

(63) Continuation of application No. PCT/FR2013/051498, filed on Jun. 27, 2013.

(30) Foreign Application Priority Data

Jul. 2, 2012 (FR) .................................... 12 56305

(51) Int. Cl.
*F02K 1/15* (2006.01)
*F02K 1/76* (2006.01)
*F02K 9/80* (2006.01)

(52) U.S. Cl.
CPC ............... *F02K 1/15* (2013.01); *F02K 1/763* (2013.01); *F02K 9/80* (2013.01); *F05D 2270/051* (2013.01)

(58) Field of Classification Search
CPC ... F02K 1/15; F02K 1/763; F02K 9/80; F02K 9/805; F02K 9/84; F02K 9/86; F02K 9/90;
(Continued)

(56) References Cited

U.S. PATENT DOCUMENTS 4,106,730 A * 8/1978 Spitzer ................. G05D 1/0072
244/182
5,706,649 A * 1/1998 Robinson ................ F02K 1/008
239/265.13
(Continued)

FOREIGN PATENT DOCUMENTS

EP  2 466 101 A2  6/2012
FR  2 930 973 A1  11/2009

OTHER PUBLICATIONS

International Search Report dated Sep. 13, 2013 in International Application No. PCT/FR2013/051498.

*Primary Examiner* — Phutthiwat Wongwian
*Assistant Examiner* — Loren Edwards
(74) *Attorney, Agent, or Firm* — Burris Law, PLLC

(57) ABSTRACT

A method for controlling a position of a variable nozzle of an aircraft includes the following steps: setting the variable nozzle in a position $P(t_0)$ at a time $t_0$ as a preliminary step; step A in which at each instant $t_i$ with $1<i<N$, an optimal position $P(t_i)$ of the variable nozzle is determined according to magnitudes distinctive of the flight of the aircraft; step B measuring a time interval $\Delta t_i$ defined as a difference between $t_i$ and $t_0$; and step C by which a displacement of the variable nozzle in a position corresponding to the optimal position $P(t_i)$ is authorized when the time interval $\Delta t_i$ is higher than a predetermined minimum threshold.

11 Claims, 3 Drawing Sheets

Figure 1:
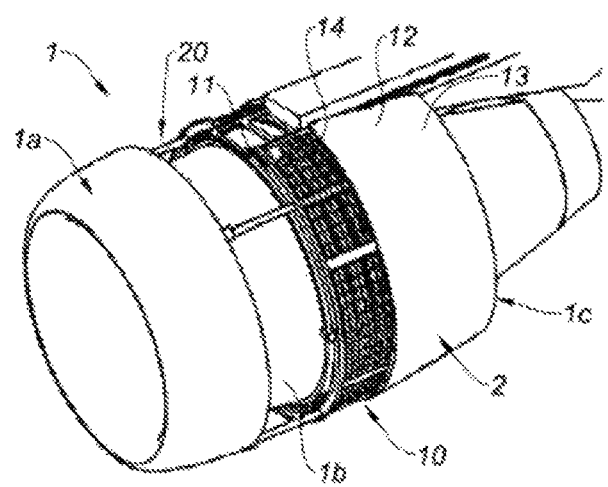

(58) Field of Classification Search
CPC .. F02K 9/92; F05D 2270/05; F05D 2270/051; F05D 2270/053
USPC .......................................... 60/771, 233, 242
See application file for complete search history.

(56) References Cited

U.S. PATENT DOCUMENTS

| | | | |
|---|---|---|---|
| 8,733,698 B2 * | 5/2014 | Abrial | F02C 9/00 244/110 B |
| 8,955,306 B2 * | 2/2015 | Maalioune | F02K 1/763 239/265.19 |
| 2011/0088369 A1 | 4/2011 | Maalioune et al. | |
| 2012/0137654 A1 | 6/2012 | Burgess | |

* cited by examiner

METHOD FOR CONTROLLING A VARIABLE NOZZLE SECTION OF AN AIRCRAFT

CROSS-REFERENCE TO RELATED APPLICATIONS

This application is a continuation of International Application No. PCT/FR2013/051498, filed on Jun. 27, 2013, which claims the benefit of FR 12/56305, filed on Jul. 2, 2012. The disclosures of the above applications are incorporated herein by reference.

FIELD

The present disclosure relates to a method for controlling a variable nozzle section of a nacelle of turbojet engine.

BACKGROUND

The statements in this section merely provide background information related to the present disclosure and may not constitute prior art.

An aircraft is moved by several turbojet engines each housed in a nacelle also accommodating a set of annex actuating devices pertaining to its operation and providing diverse functions when the turbojet engine is in operation or stopped.

A nacelle generally exhibits a tubular structure comprising an air inlet upstream of the turbojet engine, a median section intended to surround a fan of the turbojet engine, a downstream section accommodating thrust reversal means and intended to surround the combustion chamber of the turbojet engine, and is generally terminated by an ejection nozzle of which the outlet is located downstream of the turbojet engine.

Modern nacelles are intended to accommodate a double flow turbojet engine able to generate by means of the blades of the fan in rotation a hot air flow (also called primary flow) from the combustion chamber of the turbojet engine, and a cold air flow (secondary flow) which circulates outside the turbojet engine through an annular passage, also called stream, formed between a fairing of the turbojet engine and an inner wall of the nacelle.

The two air flows are ejected from the turbojet engine by the rear of the nacelle.

The role of a thrust reverser is, during the landing of an aircraft, to improve the braking capacity of the latter by redirecting towards the front at least part of the thrust generated by the turbojet engine.

In this phase, the reverser obstructs the stream of the cold air and directs the latter towards the front of the nacelle, thereby generating a counter thrust which is added to the braking of the wheels of the airplane.

The means implemented to achieve this reorientation of the cold flow vary according to the type of reverser.

It may, in particular, be mentioned thrust reversers with gates typically comprising, a thrust reversal cowl associated with gates for diverting the flow uncovered by thrust reversal shutters displaceable by a cowl movement.

Apart from its thrust reversal function, the moveable cowl belongs to the rear section and exhibits a downstream side forming an ejection nozzle for channeling the ejection of the air flows.

This nozzle may come as a complement to a primary nozzle channeling the hot flow and is thus called secondary nozzle.

This nozzle may be moveable with respect to the nacelle in such a manner as to adjust the section for ejecting the stream of cold air flow, according to the position of said nozzle.

The moveable nozzle is also called moveable structure for adjusting the outlet section of the stream.

The optimal section of the nozzle may be adapted according to the different flight phases, namely the take-off, climb, cruise, descent and landing phases of the aircraft.

It is associated with an actuating system allowing to optimize and make its section vary, according to the flight phase in which the aircraft is in.

There are several solutions for achieving the section variation of the nozzle, according to the nacelle form to consider and the provided actuating systems.

Thus, the moveable nozzle may be driven in translation along a substantially longitudinal direction of the nacelle or by pivoting around an axis perpendicular to the longitudinal axis of the nacelle, by a dedicated actuator or not and independently or not from a partial translation of the thrust reverser cowl.

Such displacements of the nozzle according to the different flight phases require methods for controlling the position of the nozzle, that is to say methods for controlling actuators associated with the displacements of the nozzle.

It is thus known, control methods and associated control systems allowing to discretely vary, between different predetermined positions, the position of the nozzle during the different flight phases.

In this context, in as far as the different predetermined positions of the nozzle are spaced apart, the fuel consumption is excessive and the operation of the motor is not optimal.

Moreover, if it is provided to define closer positions for the nozzle, the passages from one position to the other become frequent, thus causing the wear of the control system and the actuating means and as a result, their reliability.

Hence, in a cruise phase of the aircraft, it is provided predetermined positions for the nozzle which are not often suited to the altitude at which the aircraft is flying, this altitude able to be modified during cruise by lightening the aircraft following a decrease in fuel reserves.

In order to optimize the operation of the motor, it is further known, control methods and associated control and actuating systems allowing to continuously, vary, the position of the nozzle during the different phases of flight.

However, this implies a permanent operation of the control system and the associated actuators for placing the nozzle in a determined position, thereby always highly affecting the reliability of these elements with the progression of the flight cycles.

SUMMARY

The present disclosure is to provides a method for: defining a rule for changing the position of the nozzle allowing to make the outlet section of the cold flow stream vary; controlling the position of the nozzle allowing to improve the fuel consumption, at each phase of flight of the aircraft; controlling the position of the nozzle allowing to improve the cruise phases, whatever the flight conditions; and mastering the wear of the control and actuating system which drives the changing in position of the nozzle during a flight.

To this end, the present disclosure provides a method for controlling a position of a variable nozzle section of an aircraft in which, based on a position P(t0) of the nozzle determined at a time t0, the method comprising the following steps:

step A in which it is determined, at each instant $t_i$ with $1<i<N$, an optimal position $P(t_i)$ of the nozzle;

step B by which it is measured a time interval $\Delta t_i$ defined as the difference between $t_i$ and $t_0$; and in step C, it is authorized the displacement of the nozzle in a position corresponding to the optimal position $P(t_i)$ when the time interval $\Delta t_i$ is strictly higher than a predetermined minimum threshold.

Advantageously, during step B, at each instant $t_i$, it is also measured a difference in position $\Delta P$ between $P(t_i)$ and $P(t_0)$ and, during step C, it is authorized the displacement of the nozzle in a position corresponding to the optimal position $P(t_i)$ when the absolute value of the difference in position $\Delta P$ is strictly higher than a predetermined minimum threshold and strictly lower than a predetermined maximum threshold.

Advantageously, during step B, at each instant ti, it is measured a difference in position $\Delta P$ between $P(t_i)$ and $P(t_0)$ and, In a determined flight phase, when the absolute value of the difference in position $\Delta P$ is higher than or equal to a predetermined maximum threshold, step C is deactivated, and the nozzle is displaced in a position $P(t_i)$ equal to a predetermined maximum position Pmax.

Advantageously, the method provides that the minimum time interval threshold and/or the maximum threshold of difference in position vary according to a magnitude distinctive of the flight such as the altitude of the aircraft.

Advantageously, the method provides that the minimum time interval threshold in climb phase of the aircraft is higher than the minimum time interval threshold in cruise phase of the aircraft.

Advantageously, step C is activated if the altitude of the aircraft, at instant $t_i$, is strictly higher than a predetermined threshold altitude.

Advantageously, when the altitude of the aircraft, at instant $t_i$, is lower than or equal to a predetermined threshold altitude, the nozzle is displaced in a position $P(t_i)$ equal to a position P of maximum outlet section of the nozzle.

Advantageously, during step A, the optimal position $P(t_i)$ of the nozzle is determined according to magnitudes distinctive of the flight such as altitude, speed of the aircraft and/or the motor regime of a turbojet engine of the aircraft.

Advantageously, the method provides, during the step A, that the optimal position $P(t_i)$ of the nozzle is determined by measurement, estimation or computation.

Further areas of applicability will become apparent from the description provided herein. It should be understood that the description and specific examples are intended for purposes of illustration only and are not intended to limit the scope of the present disclosure.

DRAWINGS

Figure 2:
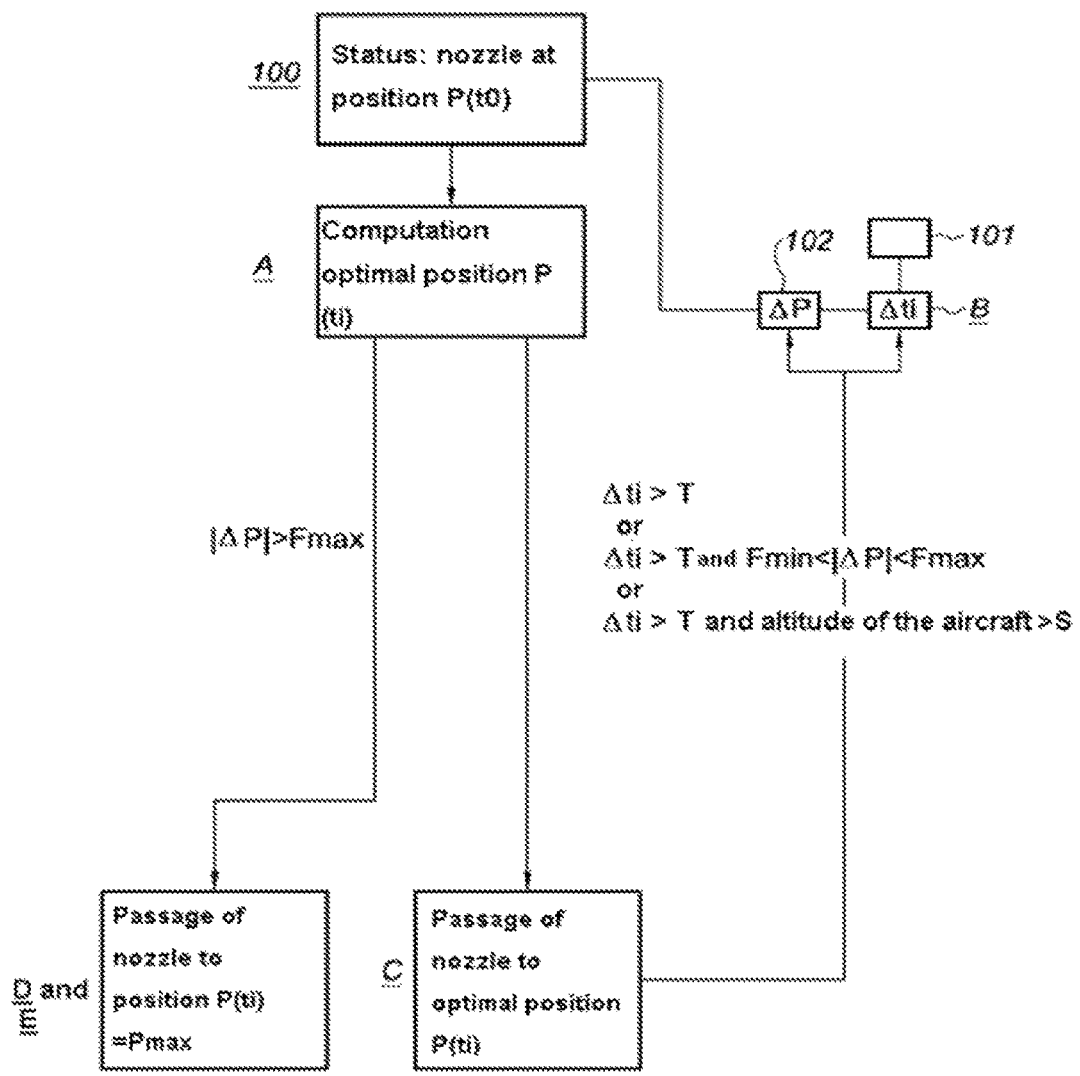
Figure 3:
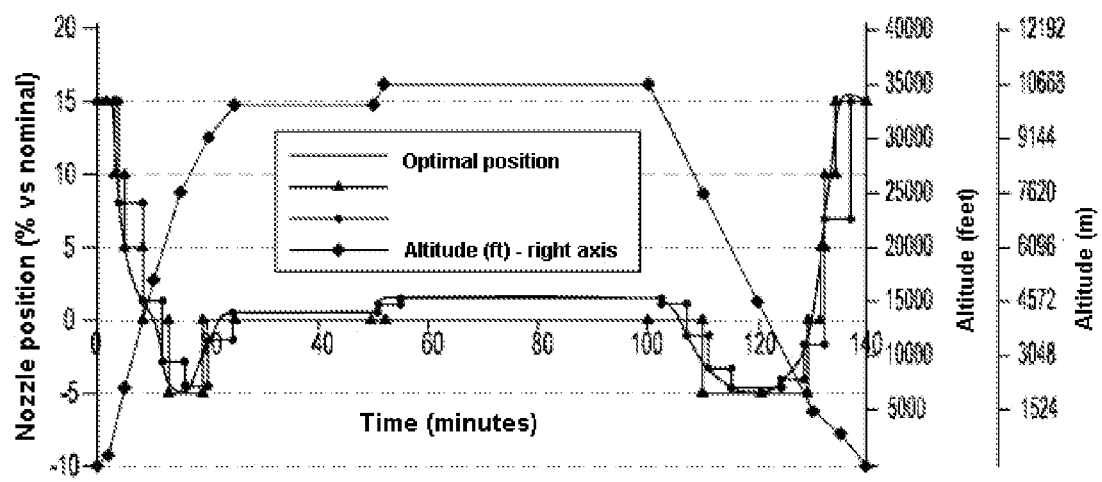

In order that the disclosure may be well understood, there will now be described various forms thereof, given by way of example, reference being made to the accompanying drawings, in which:

FIG. 1 is a perspective schematic representation of a nacelle equipped with a moveable nozzle section;

FIG. 2 represents a logical diagram of a method for controlling in position of the nozzle of FIG. 1, according to one form of the present disclosure; and FIG. 3 is a graphic representation comparing the position of the nozzle determined by the method for controlling in position of the nozzle, according to one form of the present disclosure and by a control method of the prior art, during a flight cycle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In reference to FIG. 1, a nacelle 1 is intended to constitute a tubular housing for a double flow turbojet engine (not represented) with a high dilution rate and serves to channel the air flows which it generates by means of the blades of a fan, namely a hot air flow crossing a combustion chamber of the turbojet engine, and a cold air flow circulating outside the turbojet engine.

This nacelle 1 generally has a structure comprising a front section forming an air inlet 1a, a median section 1b surrounding the fan of the turbojet engine, and a downstream section 1c surrounding the turbojet engine.

The downstream section 1c comprises an outer structure 2 possibly comprising a thrust reversal system and an inner fairing structure of the motor defining with the outer surface a stream intended for the circulation of the cold flow, in the case of a nacelle of double flow turbojet engine such as discussed here.

As described above, the downstream section is equipped with the thrust reversal device 10 comprising a front frame 11, a moveable cowl of thrust reverser 12, and a nozzle 13 of variable section.

In a non-limiting form of a thrust reversal device with grids, the moveable cowl 12 is able to be actuated along a substantially longitudinal direction of the nacelle between, in particular but not exclusively, a closing position in which it comes in contact with the front frame 11 and provides the aerodynamic continuity of the lines of the downstream section and covers deviation grids 14, and an opening position in which it is spaced apart from the front frame 11, thus revealing a passage in the nacelle and uncovering deviation grids 14. This last position is illustrated on FIG. 1.

During its opening, the moveable cowl may drive in rotation a shutter (not visible on the figure) by means of a connecting rod fixed in the inner fairing structure, said shutter blocking at least partially the stream in such a manner as to add the air flow reversal.

According to the form of the selected thrust reverser with grids, the deviation grids 14 may take any known shape. They can, thus, be stationary or moveable in translation or rotation. They can, more particularly, be moveable in translation between a retracted position within the median structure and a deployed position in which they extend downstream of the median section at the downstream section in reverse jet phase. Alternatively, they can be moveable in translation between a radially stacked or longitudinally aligned position.

Furthermore, the moveable cowl 12 is extended by at least the nozzle section 13 mounted at a downstream end of said moveable cowl.

The nozzle 13 is moveable and it is also called moveable structure for adjusting the outlet section of the cold air flow stream.

The outlet section of the nozzle 13 may be adjusted according to the different phases of flight namely the take-off, climb, cruise, descent and landing phases of the aircraft.

This nozzle 13 is associated with a controlling and actuating system 20 to control and drive in displacement the nozzle 13 by a necessary distance according to a given control, in order to obtain a required outlet section of the cold air flow stream.

This controlling and actuating system 20 allows varying and adjusting the nozzle section according to the phase of flight in which the aircraft is.

This controlling and actuating system 20 may take any known shape. For example, the actuating means may be means for driving in translation or rotation the nozzle in such a manner as to achieve the section variation of the nozzle.

The variation of the nozzle section 13 which illustrates the variation in section of the cold air flow stream is carried out by the passage of the nozzle 13 from one position to another, resulting in a different section thanks to a longitudinal displacement of the nozzle 13 and/or the reversal cowl 12 along the longitudinal axis of the nacelle or by an angular displacement of the nozzle 13 to the inside and/or outside of the stream.

In another form of the nacelle, the nozzle is formed of downstream pivoting shutters mounted at a downstream end of the reversal cowl of which the pivoting to the inside or the outside of the stream translates by an increase or a decrease of the outlet section of the stream.

In other form, the nozzle is formed of panels mounted moveable in translation inside the moveable cowl in a telescopic manner and of which the reversing downstream of the nacelle or the retraction causes the increase or the decrease of the outlet section of the stream.

In still another form, the nozzle is formed by the downstream end of the cowl and the cooperation of the conical shape of the inner structure of the nacelle and the reversal cowl moveable in translation between the upstream and the downstream of the nacelle causes the increase or decrease of the outlet section of the stream.

These forms are not limiting and any other alternative form of variable nozzle allowing an increase and/or a decrease of outlet section of the stream may be considered in the scope of the control method according to the present disclosure.

In fact, whatever the selected controlling and actuating system and the selected alternative form of variable nozzle, this controlling and actuating system involves the presence of a method for controlling in position of the nozzle, controlled by an electronic controlling unit.

In reference to FIG. 2, the logical diagram of a method for controlling the position of the nozzle that is to say of the variation of the outlet section of the nozzle, according to the present disclosure is represented.

First, at a preliminary step 100, the nozzle is in a determined position P(t0) at a time t0.

In a non-limiting manner, this position may be a maximum, minimum or intermediate nozzle section position.

According to the present disclosure, the method for controlling a position of the nozzle provides the following steps:

It is determined, at each instant $t_i$ with $1 < i < N$, an optimal position $P(t_i)$ of the nozzle;

It is measured a time interval $\Delta t_i$ defined as the difference between $t_i$ and $t_0$ and, It is authorized the displacement of the nozzle in a position corresponding to the optimal position $P(t_i)$ when the time interval $\Delta t_i$ is strictly higher than a predetermined minimum threshold T.

Thus, advantageously, it is defined a variable nozzle system able to be positioned in all possible positions for the nozzle without restriction but for which each position of the nozzle is maintained during a period higher than a predetermined threshold T.

More particularly, during the step A, it is determined, in real time, a setpoint in optimal position $P(t_i)$ of the nozzle by measurement, estimation, mapping or computation.

This determination of the optimal position $P(t_i)$ of the nozzle, for an instant $t_i$ of the flight, may be carried out by any known method, in a non-limiting manner.

According to one selected form, it is determined the optimal position $P(t_i)$ of the nozzle according to magnitudes distinctive of the flight such as the altitude, speed of the aircraft and/or the motor regime of the turbojet engine of the aircraft.

These magnitudes may be measured by suitable sensors, estimated by mapping or other or computed.

Furthermore, in a step 101 prior to the step B, it is determined the minimum time interval threshold T.

The latter may be set for the entire flight or vary according to a magnitude distinctive of the flight.

For example, this distinctive magnitude is a particular phase of the flight and/or the altitude which the aircraft is at.

Hence, it is provided a step in which it is determined the minimum time interval threshold value T according to a magnitude distinctive of the flight.

In this step, it may be provided to modify the minimum time interval threshold value T when the altitude of the aircraft exceeds a minimum threshold value.

In one form, when the altitude of the aircraft exceeds this threshold value, the minimum time interval threshold value T is increased.

In a non-exclusive form of the previous ones, it may be provided that the minimum time interval threshold T in take-off and/or climb phase of the aircraft may be lower than the minimum time interval threshold T in cruise phase of the aircraft, and the parameters influencing the change in position are liable for varying more rapidly in these phases of flight.

This has the advantage of adding the number of position changes of the nozzle in particular during the take-off and climb phases of the aircraft and reducing the number of position changes of the nozzle in cruise phases of the aircraft where the flight conditions hardly change.

Furthermore, during the step B, it may be provided an intermediate step 102, at each instant ti, in which it is measured a difference in position $\Delta P$ between $P(t_i)$ and $P(t_0)$.

During the step C, in a step 103, it is authorized the displacement of the nozzle in a position corresponding to the optimal position $P(t_i)$ when the absolute value of the difference in position $\Delta P$ is strictly higher than a predetermined minimum threshold Fmin and strictly lower than a predetermined maximum threshold Fmax.

Thus, it is authorized for the nozzle to be displaced if the determined change in position amplitude has exceeded a certain predetermined minimum threshold Fmin.

Advantageously, thus, it is prevented any untimely change in position of the nozzle during the flight phases and, in particular, during the cruise phases in which the flight conditions are hardly modified.

It is reduced the risks of wear of the controlling and actuating system associated with the displacements of the nozzle.

Furthermore, when the absolute value of the difference in position $\Delta P$ is higher than or equal to the predetermined maximum threshold Fmax, it is achieved the following step D, namely the step C is deactivated that is to say it is deleted the temporal threshold between two changes in position of the outlet section of the nozzle and, the nozzle is displaced in a position $P(t_i)$ equal to a predetermined maximum position Pmax.

This case illustrates a case of a rapid variation of the motor regime requiring a rapid change in position of the outlet section of the nozzle, such as, for example and in a non-limiting manner, a phase of go-around.

It is worth noting that the maximum threshold Fmax of difference in position may be set during a flight or vary according to a magnitude distinctive of the flight such as the altitude of the aircraft.

Furthermore, in one form of the control method, it is provided to activate the step C when the altitude of the aircraft, at the instant ti, is strictly higher than a predetermined threshold altitude S.

In the opposite case, it is achieved a step (not illustrated) in which the nozzle is displaced in a position $P(t_i)$ equal to a position P of maximum outlet section of the nozzle compatible with the field of low altitude flight of the aircraft.

This step may take place during the flight phases near to the ground or on the ground.

On FIG. 3, it is compared, in a graphic representation, the different determined positions of the variable section nozzle, during a given flight, of a given duration, by the control method according to the present disclosure (curve with round points), by a control method of the prior art (curve with triangular points) which controls the nozzle between several predetermined discrete positions during the flight and by a control method defining at each instant the optimal position of the nozzle (smooth curve).

These graphic representations are superimposed on a graphic defining the altitude of the aircraft in ordinates according to the flight time in abscissae.

The experimental conditions for these graphic representations are the following:

It is supposed that the variation amplitude of the outlet section of the nozzle is of −5%/+15% with for reference the nominal cruise position;

T has a value of 4 minutes and Fmin has a value of 0.5%.

On these graphics, it is observed that with a control method controlling a positioning of the nozzle in a discrete number of positions, in cruise phase (represented by two stages at two different altitudes), the nozzle is not positioned at its optimal position.

On the contrary, with a control method according to the present disclosure, the nozzle is observed at an appropriate operating position of the turbojet engine in cruise and for the entirety of the flight.

Thus, with respect to the control methods of the prior art, the one skilled in the art will appreciate, with a control method according to the present disclosure, a method allowing for a given cruise phase, to properly adjust the position of the nozzle so that it corresponds to that for which the fuel consumption is improved.

In fact, the control method according to the present disclosure advantageously allows, adjusting the cruise phases of the aircraft by low variations of the position of the nozzle.

Thus, on a long haul plane, the control method according to the present disclosure, allows defining a proper position of the nozzle whatever the cruise phase and the altitude at which it is achieved.

The control method according to the present disclosure further, reduces the wear of the controlling and actuating system associated with the method according to the present disclosure. In fact, it can be determined and mastered the number of operating cycles of the controlling and actuating system during a flight of a given duration as this number of cycles is raised by the flight time divided by the minimum authorized threshold T between two changes in position of the nozzle.

Of course, the present disclosure is not limited to the sole forms of this nacelle, described above by ways of examples, but it on the contrary encompasses other forms. Thus, in particular the moveable nozzle could be associated with a smooth nacelle and not a nacelle 5 equipped with a thrust reverser.

What is claimed is:

1. A method for controlling a position of a variable nozzle of an aircraft, the variable nozzle being in a position $P(t_0)$ at a time $t_0$, said method comprising the following steps:
    step A: determining, at each instant $t_i$ with 1<i<N, an optimal position $P(t_i)$ of the variable nozzle according to magnitudes distinctive of the flight of the aircraft, the optimal position $P(t_i)$ corresponding to an optimal outlet section of a stream for improved fuel efficiency;
    step B: measuring a time interval $\Delta t_i$ as a difference between $t_i$ and $t_0$ and measuring, at each instant $t_i$, a difference in position $\Delta P$ between $P(t_i)$ and $P(t_0)$; and
    step C: authorizing, during the flight, a displacement of the variable nozzle in a position corresponding to the optimal position $P(t_i)$ when the time interval $\Delta t_i$ is higher than a predetermined minimum threshold and authorizing the displacement of the variable nozzle in a position corresponding to the optimal position $P(t_i)$ when an absolute value of the difference in position $\Delta P$ is strictly higher than a predetermined minimum position threshold and strictly lower than a predetermined maximum threshold.

2. The method according to claim 1,
    further comprising step D: in a determined flight phase, deactivating the step C when an absolute value of the difference in position $\Delta P$ is higher than or equal to a predetermined maximum threshold, and
    step E: displacing the variable nozzle in a position $P(t_i)$ equal to a predetermined maximum position Pmax.

3. The method according to claim 1, wherein a minimum time interval threshold and/or a maximum threshold of difference in position vary according to a magnitude distinctive of the flight.

4. The method according to claim 3, wherein the minimum time interval threshold and/or a maximum threshold of difference in position vary according to an altitude of the aircraft.

5. The method according to claim 3, wherein a minimum time interval threshold in a climb phase of the aircraft is higher than a minimum time interval threshold in a cruise phase of the aircraft.

6. The method according to claim 1, wherein step C is activated if an altitude of the aircraft, at instant is higher than a predetermined threshold altitude.

7. The method according to claim 6, wherein when the altitude of the aircraft, at the instant $t_i$, is lower than or equal to the predetermined threshold altitude, the variable nozzle is displaced in a position $P(t_i)$ equal to a position P of maximum outlet section of the variable nozzle.

8. The method according to claim 1, wherein during step A, the optimal position $P(t_i)$ of the variable nozzle is determined according to magnitudes distinctive of the flight.

9. The method according to claim 8, wherein the magnitudes distinctive of the flight are at least one of an altitude, speed of the aircraft and a motor regime of a turbojet engine of the aircraft.

10. The method according to claim 8, wherein during step A, the optimal position $P(t_i)$ of the variable nozzle is determined by measurement, estimation or computation.

11. The method according to claim 1, wherein the flight of the aircraft includes a take-off phase, a climb phase, a cruise phase, a descent phase, and a landing phase.

* * * * *